(12) United States Patent
Liao

(10) Patent No.: US 8,480,044 B2
(45) Date of Patent: Jul. 9, 2013

(54) OMNI-DIRECTION ROTATABLE DUAL-CUP SUCTION DEVICE

(75) Inventor: Po Lin Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 266 days.

(21) Appl. No.: 12/885,971

(22) Filed: Sep. 20, 2010

(65) Prior Publication Data
US 2012/0043439 A1 Feb. 23, 2012

(30) Foreign Application Priority Data
Aug. 17, 2010 (TW) .............................. 99215753 U

(51) Int. Cl.
F16B 47/00 (2006.01)
F16M 11/14 (2006.01)
B25B 11/00 (2006.01)
B25B 1/22 (2006.01)
B23Q 3/02 (2006.01)

(52) U.S. Cl.
USPC .................. 248/205.8; 248/205.5; 248/205.9; 248/206.3; 248/206.4; 248/683; 269/21; 269/95; 269/71

(58) Field of Classification Search
USPC .......... 248/205.5, 205.7, 205.8, 205.9, 206.2, 248/206.3, 206.4, 683, 363; 269/21, 95, 71
See application file for complete search history.

(56) References Cited

U.S. PATENT DOCUMENTS

| | | | | |
|---|---|---|---|---|
| 373,362 A * | 11/1887 | Hamilton | ...................... | 600/234 |
| 538,534 A * | 4/1895 | O Niell | .............................. | 108/8 |
| 947,751 A * | 1/1910 | Long et al. | .................... | 403/143 |
| 1,509,068 A * | 9/1924 | Herron | ........................ | 248/181.1 |
| 2,861,501 A * | 11/1958 | Strelakos | ....................... | 359/802 |
| 3,783,547 A * | 1/1974 | Bystrom et al. | ................ | 43/21.2 |
| 4,066,231 A * | 1/1978 | Bahner et al. | ................. | 248/552 |
| 4,872,630 A * | 10/1989 | Cooper | ...................... | 248/278.1 |
| RE34,120 E * | 11/1992 | Plahn | ......................... | 248/206.3 |
| 5,279,488 A * | 1/1994 | Fleming | ..................... | 248/279.1 |
| 5,360,018 A * | 11/1994 | Chen | ............................. | 128/849 |
| 5,513,784 A * | 5/1996 | Pretorius | ....................... | 224/584 |
| 5,769,369 A * | 6/1998 | Meinel | ........................ | 248/176.1 |
| 5,806,821 A * | 9/1998 | Phillips et al. | ........... | 248/288.51 |
| 5,894,705 A * | 4/1999 | Sutton | .......................... | 52/747.1 |
| D459,958 S * | 7/2002 | Smith | ............................. | D8/14 |
| 6,513,774 B2 * | 2/2003 | Hailson | .................... | 248/288.51 |
| 6,802,275 B2 * | 10/2004 | Schmidt | ....................... | 114/361 |
| 7,246,781 B2 * | 7/2007 | Nam | ............................. | 248/516 |
| 7,302,907 B2 * | 12/2007 | Carlton | ........................ | 114/364 |
| 2007/0138358 A1 * | 6/2007 | Chang | ........................ | 248/205.5 |
| 2008/0197250 A1 * | 8/2008 | Kaneda et al. | ............. | 248/206.3 |
| 2012/0006952 A1 * | 1/2012 | Tsai | ........................... | 248/206.3 |

* cited by examiner

*Primary Examiner* — Jonathan Liu
*Assistant Examiner* — Chiedu Chibogu
(74) *Attorney, Agent, or Firm* — Muncy, Geissler, Olds & Lowe, PLLC

(57) ABSTRACT

An omni-direction rotatable dual-cup suction device includes two suction cups, which are respectively combined with and in communication with two evacuation structures, so that the two evacuation structures can evacuate air from the suction cups to induce vacuum suction forces. The two suction cups are respectively provided with a mounting seat and an attaching seat for securely coupling the two evacuation structures. The mounting seat includes a pillar fixed thereto. A collar receives a ball end of a bar therein and is attached to the pillar. The ball-ended bar is coupled to a threaded rod, which extends through an internally-threaded locking knob and received into the attaching seat to be secured by a nut. With such an arrangement, one of the suction cups can be attached to a planar fixture surface, while the other suction cup can be used to hold an article and is orientation adjustable in any direction.

6 Claims, 7 Drawing Sheets

OMNI-DIRECTION ROTATABLE DUAL-CUP SUCTION DEVICE

BACKGROUND OF THE INVENTION

1. Field of the Invention

The present invention relates to the field of orientation-adjustable suction device, and in particular to an omni-direction rotatable dual-cup suction device, of which one suction cup can be attached to a planar fixture surface and another suction cup can be used to hold for example a tablet computer to allow for easy orientation adjustment to facilitate the operation of the computer by adjusting orientation or the use of the computer in an exhibition.

2. The Related Arts

Suction devices are commonly used. Various constructions of suction device are known, including a simply-structured suction cup that is often used to hold a navigation device or a smart mobile phone, such as PDA, inside an automobile by having a rack or clamp receiving and holding the navigation device and a cup body attached inside the front windshield. Such a simply-structured suction cup often provides a suction force that, although capable of holding a small article, such as a navigation device or PDA, is insufficient to support a large article, such as a tablet computer or an iPad. This renders the conventional suction cup useless in holding a tablet computer.

Another known type of suction device is operated through depression. The depression is often of a limited stroke, making the suction force induced by the depression limited and thus potentially insufficient. Further, any air leakage that leads to loss of suction force cannot be easily identified. Thus, it often occurs that an article held by the suction device may accidently get falling, leading to undesired damage of the article. In addition, the use of such a known suction device is not easy and also adjustment of orientation is usually not possible for such a suction device. In addition, the rack or clamp provided on the suction device is not adequate for holding a tablet computer.

A regular tablet computer, such as iPad, must be positioned on a fixture top for operation of the computer due to the fact that the tablet computer lacks an outer casing or support frame. This makes the handling and carrying of the tablet computer difficult and also not suitable for exhibition. Further, a user might wish to place the tablet computer on the laps when the user is sitting in a car or even at home. This is not convenient and may cause pain and discomfort, so that the usefulness and value of the computer may be deteriorated.

The present inventor disclosed in previous patent applications a pump combined suction device, which is provided with an alarm mark and is operated through pumping operation for evacuation of air so that the vacuum suction achieved by such a device is improved. Such a device is also provided with a locking structure. However, adjustment of angular position is not possible for such a known device. Further, such a known device is not suitable for tablet computers.

Thus, it is desired to provide a novel structure of suction device that overcomes the above discussed problems.

SUMMARY OF THE INVENTION

The problem to be addressed by the present invention is that the existing suction devices, including the simple suction cup, the depression type suction device, and the pumping type suction device, all show drawbacks, wherein the simple suction cup provides a suction force that is very limited and insufficient to support a tablet computer, which is retained on the suction cup by a clamp or a rack that provides a clamping force that may also be insufficient for a tablet computer; the depression type suction device provides a suction force that is slightly enlarged, but is still insufficient and of a limited level, due to the limited stroke of depression, and comprises no alarm mark, making it possible for an article to unexpectedly fall off the suction device due to leakage of air and thus loss of suction force thereby leading to damage of the article and any stuffs located around the suction device; and the pumping type suction device, although allowing repeated operation for air evacuation to provide a large suction force and comprising an alarm mark to easy identification of any possible dangerous situations, is not provided with orientation adjusting structure and lacks of a suitable structure for holding an article thereon.

To solve such problems and drawbacks, the present invention provides an omni-direction rotatable dual-cup suction device, which comprises two suction cups, which are respectively combined with and in communication with two evacuation structures, so that the two evacuation structures can evacuate air from the suction cups to induce vacuum suction forces. The two suction cups are respectively provided with a mounting seat and an attaching seat for securely coupling the two evacuation structures to the two suction cups. The mounting seat comprises a pillar fixed thereto. A collar receives a ball end of a bar therein and is attached to the pillar by a threaded tightening element. The ball-ended bar is coupled to a threaded rod, which extends through an internally-threaded locking knob and received into the attaching seat to be secured by a nut. With such an arrangement, one of the suction cups can be attached to a planar fixture surface, while the other suction cup can be used to hold an article, such as a tablet computer. The tightening element can be operated to release the pillar so that the orientation of the article and the one of the suction cups carrying the article can be adjusted to thereby enhance the practicability for exhibition purposes and realize multiple efficacies.

As compared to the known devices, the effectiveness of the present invention is that the omni-direction rotatable dual-cup suction device can be attached to for example a desk top with one suction cup while holding a tablet computer with another suction cup in a manner allowing for adjustment of orientation of the tablet computer to for example face a user. This allows the tablet computer to be oriented to an optimum angular position for use of the computer, so that the usefulness and value of a tablet computer can be improved, and allowing the tablet computer to be used for exhibition purposes by attaching the suction device to a wall and orienting the computer toward people. In this way, the effect of exhibition can be significantly improved for attracting consumers. Further, the suction device of the present invention can be attached inside a windshield of a car and allows a tablet computer attached thereto to be adjusted to the best orientation for watching by passengers sitting inside the car. As such, the usefulness of the tablet computer can be improved.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENT

Figure 1:
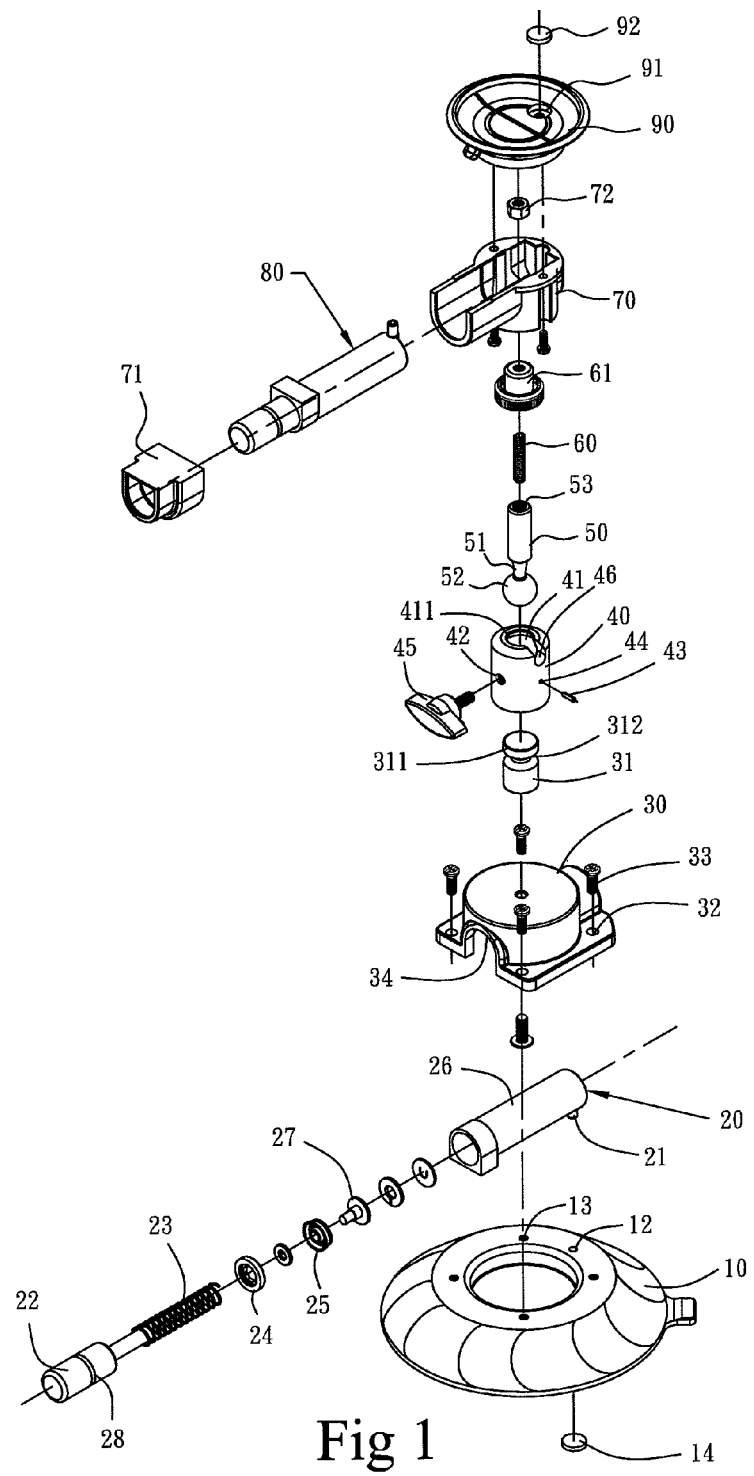
FIG. 1 is an exploded view of an omni-direction rotatable dual-cup suction device constructed in accordance with an embodiment of the present invention.
Figure 2:
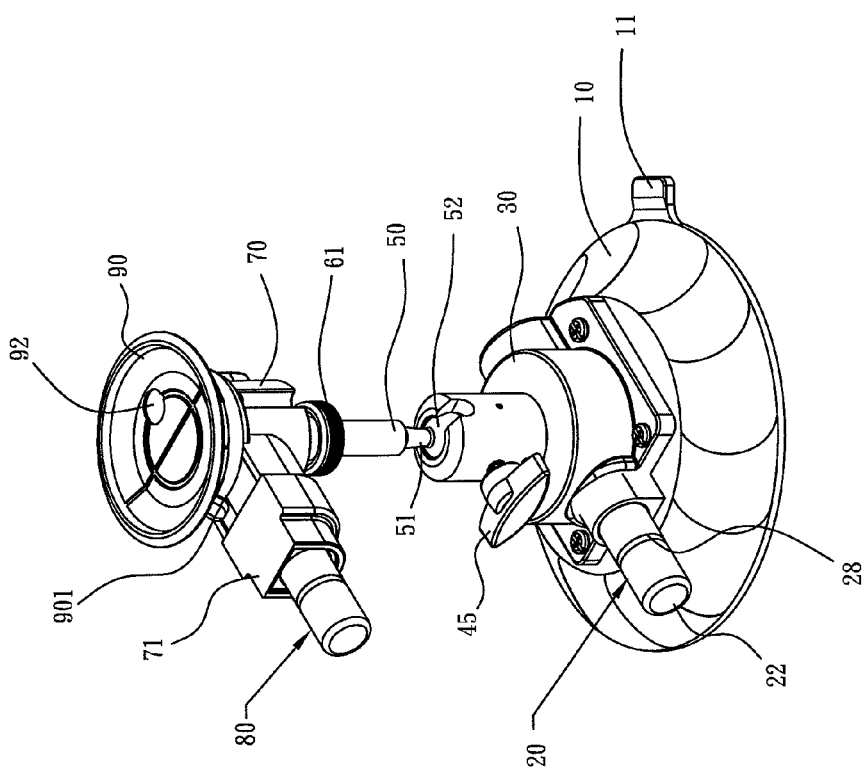
FIG. 2 is a perspective view of the omni-direction rotatable dual-cup suction device of the present invention.

With reference to the drawings and in particular to FIGS. 1 and 2, which respectively show an exploded view and a perspective view of an omni-direction rotatable dual-cup suction device, the omni-direction rotatable dual-cup suction device of the present invention comprises first and second suction cups 10, 90, which are coupled to each through an orientation-adjustable coupling structure so that the relative angular position between the two suction cups 10, 90 is adjustable as desired.

The first suction cup 10 comprises a cup-like body having an open end that is positioned to face a given first direction, such as facing downward. The second suction cup 90 comprises a cup-like body having an open end that is orientated to face a given second direction, such as facing upward, which is generally not identical to the first direction. The first and second suction cups 10, 90 are respectively provided with first and second evacuation structures 20, 80, which are operable for successive cycles or at least one cycle to evacuate air from the suction cups 10, 90 in order to induce inside the suction cups 10, 90 a negative pressure or vacuum condition, which in turns generates a suction force on the suction cups 10, 90. The first and second evacuation structures 20, 80 are respectively coupled to the suction cups 10, 90 by a mounting seat 30 and an attaching seat 70. The mounting seat 30 comprises a pillar 31 fixed thereto and having a free end portion 311, which forms an engagement section 312 having a conic configuration. A collar 40 forms a through bore 41. A ball-ended bar 50 has an end that forms a ball 52 that is connected to the bar 50 by a recessed neck 51, which can be a circumferential groove. The bar 50 has an opposite free end in which an internally-threaded hole 53 is defined. The collar 40 forms a stop flange 411 at an end thereof and circumferentially extending along an inner circumference of the bore 41 to define a diameter-reduced opening. The bar 50 is received through the bore 41 of the collar 40 with the ball 52, which is of an enlarged diameter and is larger than the stop flange 411, engaging and thus retained inside the bore 41 of the collar 40 by the stop flange 411 in such a manner that the ball 52 is allowed to do limited movement and rotation inside the bore 41. The pillar 31 is then inserted into the bore 41 of the collar 40 to such an extent that an end face of the pillar 31 is set in engagement with the ball 52 to confine the ball 52 inside the bore 41. A tightening element 45, which is preferably a threaded fastener, is received in and in threading engagement with an internally-threaded through hole 42 defined in a circumferential wall of the collar 40 and communicating the bore 41 so that a tip of the tightening element 45 that is received through the hole 42 into the bore 41 engages and abuts against the engagement section 312 to selectively apply a force to and thus cause deformation of the engagement section 312. A pin 43 is set through an aperture 44 that is defined through the circumferential wall of the collar 40 to be partially received in and engage the engagement section 312 for more securely retaining the collar 40. The internally-threaded hole 53 of the bar 50 receives and threadingly engages a threaded rod 60 and the threaded rod 60 is received through and in threading engagement with an internally-threaded locking knob 61 and further extends into the attaching seat 70 to be tightened by a nut 72.

Each of the first evacuation structure 20 and the second evacuation structure 80 comprises a barrel 26, an air drawing tube 21, a pumping bar 22, a resilient element 23, a cushion ring 24, and a rubber ring 25. The barrel 26 has a closed end from which the air drawing tube 21 extends to have an end received into a through hole 12, 19 defined in the first suction cup 10 or the second suction cup 90. The pumping bar 22 is first fit with the resilient element 23, which in the embodiment illustrated is a helical spring, the cushion ring 24, and the rubber ring 25 and then engages a screw 27 to secure the cushion ring 24 and the rubber ring 25 to the pumping bar 22. The assembly of the pumping bar 22 so constructed is then inserted into the barrel 26 through an opposite open end of the barrel 26 to complete the first evacuation structure 20 or the second evacuation structure 80.

Preferably, the through hole 12 defined in the first suction cup 10 receives a first filter 14 mounted thereto or arranged therein.

Preferably, the through hole 19 defined in the second suction cup 90 receives a second filter 92 mounted thereto or arranged therein.

The collar 40 defines a notch 46 that extends through the stop flange 411 and a portion of the circumferential wall of the collar 40 and has a width sufficient to receive the neck 51 of the bar 50 to move in/out of the notch 46. This arrangement allows the bar 50 to rotate with respect to the collar 40 into the notch 46 to define an included angle with respect to the collar 40 that can be as large as 90 degrees or even larger, if desired.

The attaching seat 70 has a distal end to which a locking element 71 is provided so that the attaching seat 70 and the locking element 71 together securely fix the second evacuation structure 80 in position.

Figure 6:
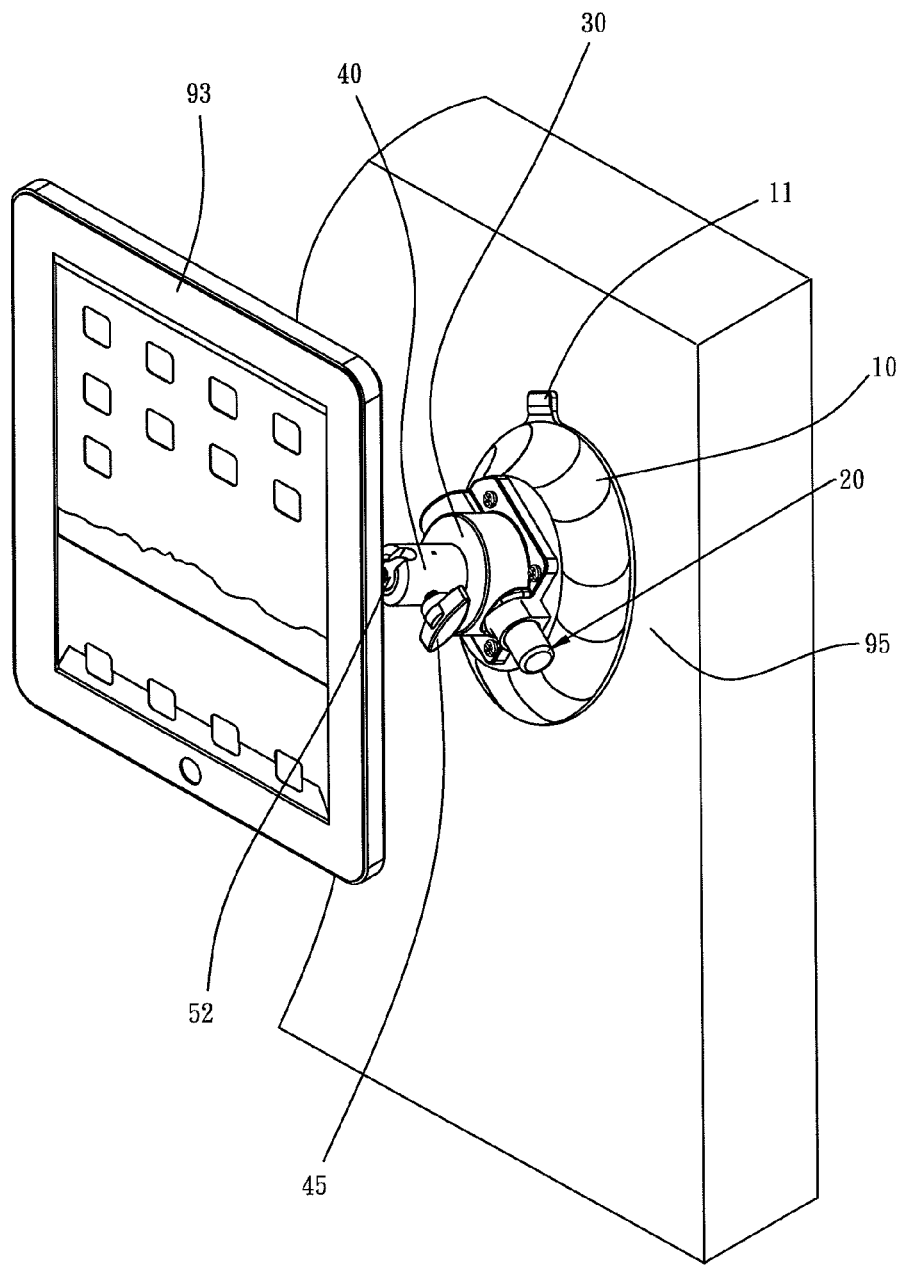
FIG. 6 is a perspective view showing the omni-direction rotatable dual-cup suction device of the present invention attached to a wall and carrying a tablet computer.

With such an arrangement, the first suction cup 10 can be used to attach to any planar fixture surface through vacuum suction, while the second suction cup 90 can be used to retain and support for example a tablet computer 93, as shown in FIG. 6, also through vacuum suction. The tightening element 45 can be manually operated to release and/or tighten the bar 50 in order to selectively orient the second suction cup 90 and the tablet computer 93 to any desired angle either in the front-rear direction or the left-right direction, whereby the tablet computer 93 held by the suction device of the present invention can be used in any desired direction for regular use or in exhibitions to thereby enhance the practicability and value thereof.

Figure 3:
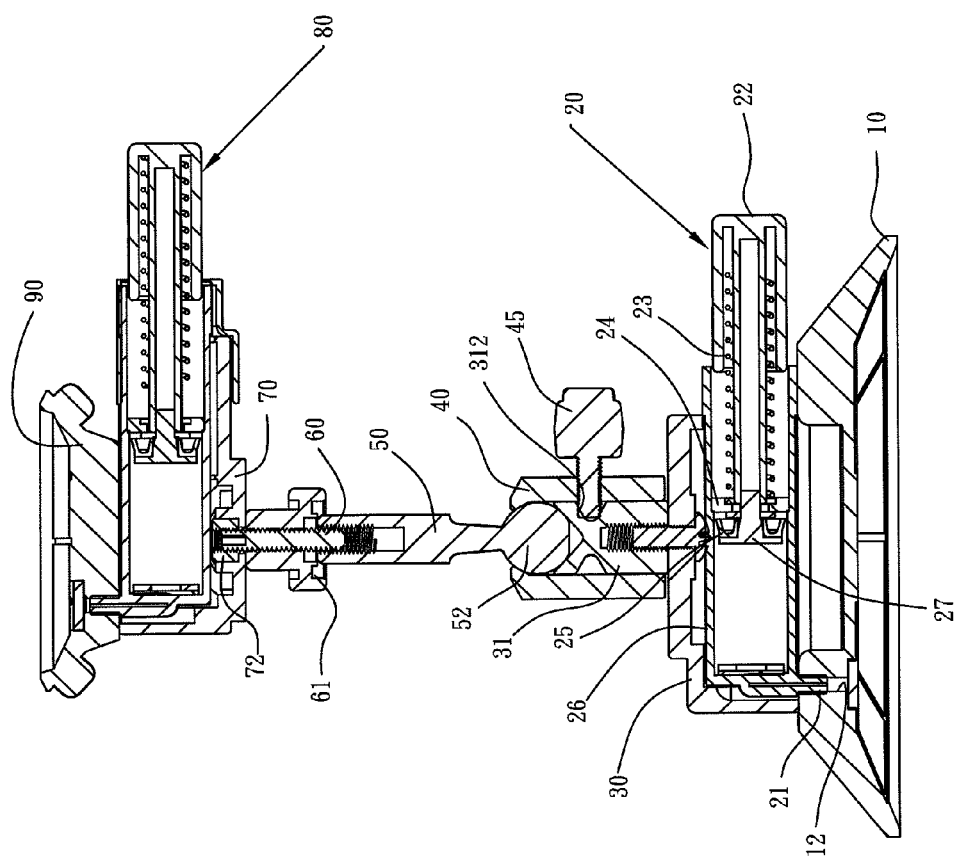
FIG. 3 is a cross-sectional view of the omni-direction rotatable dual-cup suction device of the present invention.
Figure 4:
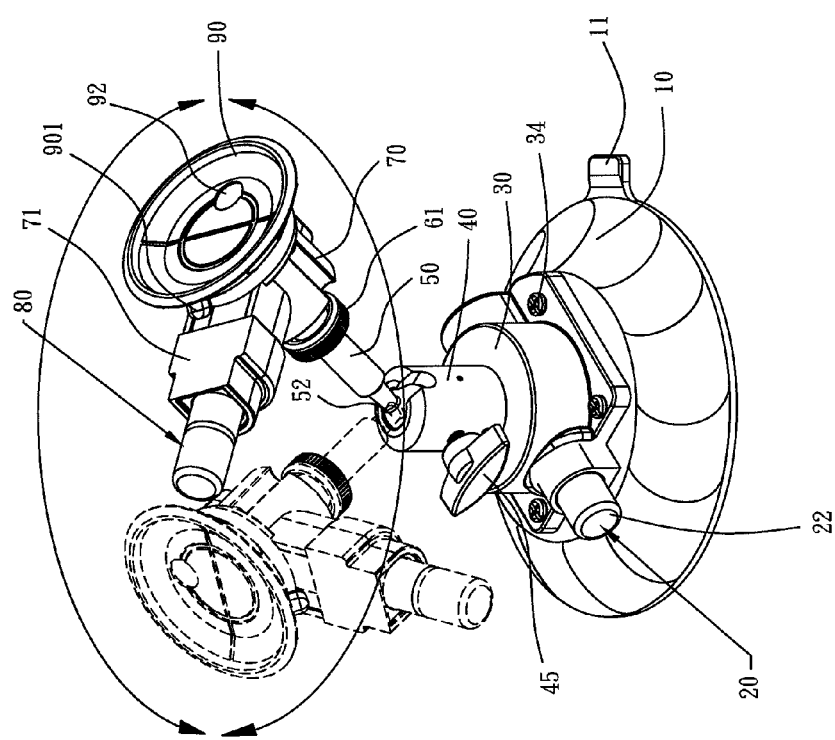
FIG. 4 is a perspective view showing adjustment of angular position of the omni-direction rotatable dual-cup suction device of the present invention.

Referring to FIGS. 1, 3, and 4, the omni-direction rotatable dual-cup suction device according to the present invention can be made in such a way that the first suction cup 10 is made of soft rubber material and has an open end facing for example downward, while the second suction cup 90 is direct to have an open end thereof facing upward. Each of the first and second suction cups 10, 90 comprises a pull tab 11, 901 extending from an outer circumference thereof for selectively manual operation by being pulled upwards to release the suction cup 10, 90. The first suction cup 10 has a flat top end in which the through hole 12, which communicates an interior space of the suction cup, and a plurality of blind holes 13, which are internally threaded. The air drawing tube 21 of the first evacuation structure 20 is fit into the through hole 12 of the first suction cup 10. The first evacuation structure 20 is composed of a barrel 26 that has a closed end from which a air drawing tube 21 extends to be fit into the through hole 12 of the first suction cup 10, and a pumping bar 22 that is first fit with a resilient element 23, a cushion ring 24, and a rubber ring 25, and then tightened by a screw 27 to for an assembly. The assembly of the pumping bar 22 is then inserted through an open end of the barrel 26 into the barrel 26, whereby reciprocal movements of the pumping bar 22 with respect to the barrel 26 evacuate air from the barrel 26 in a direction along the pumping bar 22 so that a negative pressure or vacuum condition is formed inside the first suction cup 10. The mounting seat 30 forms a plurality of through holes 32 corresponding respectively to the internally-threaded holes 13 of the first suction cup 10 and bolts 33 are respectively received through the holes 32 of the mounting seat 30 to engage the internally-threaded holes 13 of the first suction cup 10 in order to fix the mounting seat 30 to the first suction cup 10. The mounting seat 30 forms a cavity 34 that is of a shape corresponding to and receives therein the first evacuation structure 20, whereby the bolts 33 that fix the mounting seat 30 to the first suction cup 10 also secures the first evacuation structure 20. The mounting seat 30 comprises the pillar 31 fixed thereto. The second evacuation structure 80 has a construction that is substantially identical to that of the first evacuation structure 20, but the second evacuation structure 80 is attached to the second suction cup 90 by the attaching seat 70. The bar 50 is coupled, in a threaded manner, to the threaded rod 60, which extends through and is in threading engagement with a internally-threaded locking knob 61 and further extends into the attaching seat 70 to be tightened by a nut 72 located inside the attaching seat 70. The pillar 31 is fit into a collar 40, which forms a bore 41 that accommodates a ball 52 of the bar 50 therein in such a way to allow for adjustment of an angular position of the bar 50 and the second suction cup 90. Once the adjustment is done, the tightening element 45 can be manually tightened to tightly engage the engagement section 312 of the mounting seat 30 to thereby retain the ball 52 in position. The second suction cup 90 can be used to hold a tablet computer 93 through vacuum suction, as shown in FIG. 5.

Figure 5:
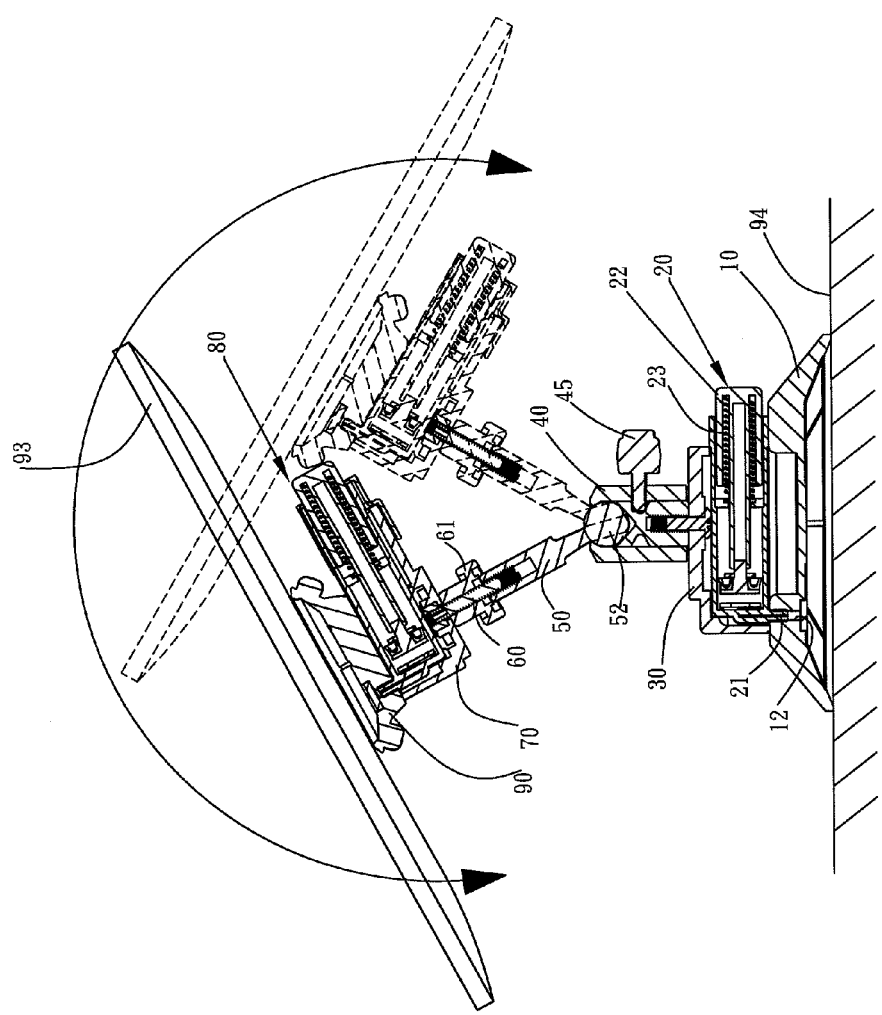
FIG. 5 is a side elevational view showing the adjustment of angular position of the omni-direction rotatable dual-cup suction device of the present invention with a tablet computer attached thereto.
Figure 7:
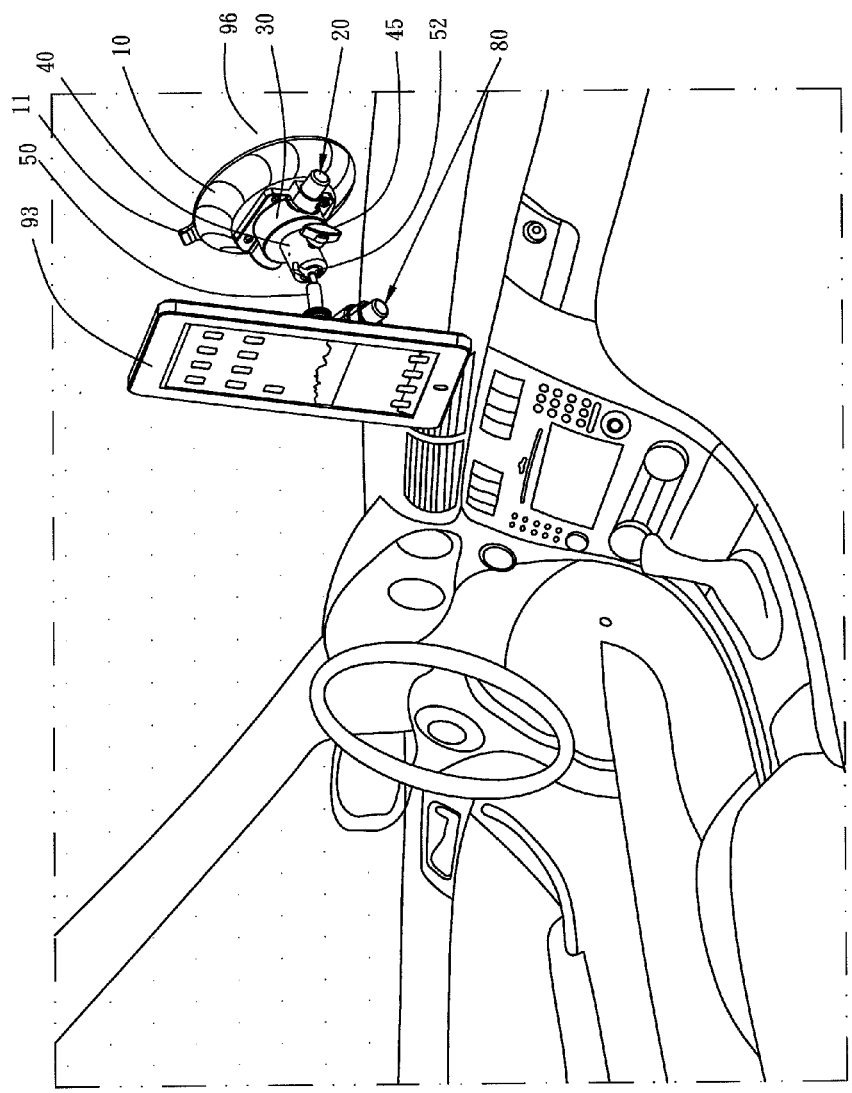
FIG. 7 is a perspective view showing the omni-direction rotatable dual-cup suction device of the present invention mounted inside an automobile and carrying a tablet computer.

Referring to FIGS. 5, 6, and 7, the omni-direction rotatable dual-cup suction device according to the present invention is constructed so that the first suction cup 10 can be attached, through vacuum suction, to any flat surface, such as a planar wall 95 or a glass panel 96 of an automobile or a household or office glass panel or a desk top 94. Further, the first evacuation structure 20 combined with the first suction cup 10 can be successively operated for repeated evacuation of air so that the suction force induced by the first suction cup 10 can be improved. The first evacuation structure 20 is provided with an alarm mark line 28, as shown in FIG. 1. When leakage of air occurs to expose the alarm mark line 28, a user is reminded to inspect and monitor a potential problem of losing suction force. This arrangement ensures operation safety. The tightening element 45 can be manually released to allow the bar 50 and the second suction cup 90, together with the tablet computer 93 attached to the second suction cup 90, to be rotated in any desired direction, including the front-rear direction and the left-right direction, to allow the tablet computer 93 to be set to an optimum orientation. This is of great help in exhibition, or allows the tablet computer 93 to be set in an angular position that is comfortable to a user for use in a specific environment, such as inside an automobile. Thus, the practicability and value of the tablet computer 93 can be enhanced. The second suction cup 90 is arranged at opposite side to the first suction cup 10 and the second evacuation structure 80 contained in the second suction cup 90 is substantially identical, in construction, to the first evacuation structure 20. Thus, an alarm mark line 28 can be provided on the second evacuation structure 80 for providing an alarm to a user in respect of loss of suction force. In addition, the second evacuation structure 80 can be successively operated for repeated evacuation of air so that the suction force induced by the second suction cup 90 can be improved. The second suction cup 90 can be used to engage and hold, through vacuum suction, a bottom face of a tablet computer 93 in order to realize excellent support and retention of the tablet computer 93 through the strong suction force induced by the second suction cup 90.

The present invention offers the following advantages:

(1) The present invention provides a novel structure of an omni-direction rotatable dual-cup suction device, which comprises a first suction cup that can be attached, through vacuum suction, to any planar fixture surface and is combined with a first evacuation structure that is successively operable for improved air evacuation and thus improved suction force; a second suction cup and a second evacuation structure for retaining and supporting for example a tablet computer in an optimum and extremely stable manner; a collar and a bar, which are arranged between the two suction cups to allow the second suction cup, together with the tablet computer supported by the second suction cup, to adjust the angular position thereof in all directions, such as the front-rear direction and the left-right direction, so as to allow for comfortable use of the tablet computer in regular operation, exhibitions, or any special environments.

(2) The unique structure of the omni-direction rotatable dual-cup suction device provided by the present invention comprises a first suction cup that can be attached through vacuum suction to any planar fixture surface for use, exhibition, or other purposes, and a collar and a bar that allow a second suction cup and any article, such as a tablet computer, carried by the second suction cup through vacuum suction to be oriented in all directions, including the front-rear direction and the left-right direction, to an optimum angular position so that the second suction cup provides an optimum way for supporting and retaining the tablet computer.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An omni-direction rotatable dual-cup suction device, comprising:

a first suction cup and a second suction cup, of which the first suction cup faces a first direction and the second suction cup faces a second direction generally different from the first direction, each of the suction cups having an outer circumference from which a pull tab extends, the first and second suction cups being respectively combined with and in communication with first and second evacuation structures, which are operable for cycles of air evacuation to induce suction forces on the first and second suction cups respectively, the first and second evacuation structures respectively coupled to the first and second suction cups by a mounting seat and an attaching seat, the mounting seat comprising a pillar fixed thereto and having a free end portion, which forms an engagement section in the form of a circumferential groove having a cross-section of a conic configuration and extending circumferentially around an axis of the pillar, a collar, which forms a through bore, a bar, which has an end that forms a ball that is connected to the bar by a recessed neck and an opposite free end in which an internally-threaded hole is defined, the collar forming a stop flange at an end thereof, the bar being received through the bore of the collar with the ball, which is larger than the stop flange, engaging and thus retained inside the bore of the collar by the stop flange to be movable inside the bore in a limited manner, the pillar being inserted into the bore of the collar to such an extent that an end face of the pillar is in engagement with and abut the ball, a threaded tightening element, which is separate from the pillar and is received in and in threading engagement with an internally-threaded through hole defined in a circumferential wall of the collar in a direction substantially perpendicular to the axis of the pillar and communicating with the bore so that a tip of the tightening element engages and abuts against the conic configuration of the circumferential groove of the engagement section to apply a force to and thus cause deformation of the engagement section, a pin, which is set through an aperture that is defined through the circumferential wall of the collar to be partially received in and engage the engagement section for retaining the collar with the pillar when the tightening element is released from engagement with the circumferential groove of the engagement section of the pillar, the internally-threaded hole of the bar receiving and threadingly engaging a threaded rod, the threaded rod being received through and in threading engagement with an internally-threaded locking knob and further extending into the attaching seat, a nut located inside the attaching seat to engage and thus secure the threaded rod;

whereby the first suction cup is adapted to attach through suction to a planar fixture surface and the second suction cup is adapted to hold, through suction, an article, wherein the tightening element is releasable to selectively orient the second suction cup and the article held thereby to a predetermined angular position in a selected direction.

2. The omni-direction rotatable dual-cup suction device as claimed in claim 1, wherein each of the first and second evacuation structures comprises a barrel, an air drawing tube, a pumping bar, a resilient element, a cushion ring, and a rubber ring, the barrel having a closed end from which the air drawing tube extends to have an end received into a through hole defined in each of the first and second suction cups, the pumping bar being first fit with the resilient element, the cushion ring, and the rubber ring and then engaging a screw to secure the cushion ring and the rubber ring to the pumping bar so as to form an assembly, which is then inserted into the barrel through an opposite open end of the barrel to complete each of the first and second evacuation structures.

3. The omni-direction rotatable dual-cup suction device as claimed in claim 1, wherein a through hole defined in the first suction cup comprises a first filter mounted thereto.

4. The omni-direction rotatable dual-cup suction device as claimed in claim 1, wherein a through hole defined in the second suction cup comprises a second filter mounted thereto.

5. The omni-direction rotatable dual-cup suction device as claimed in claim 1, wherein the collar defines a notch that extends through the stop flange and the circumferential wall of the collar and has a width sufficient to receive the neck of the bar to move in/out of the notch, whereby the bar is rotatable with respect to the collar into the notch to define an included angle with respect to the collar that is as large as 90 degrees.

6. The omni-direction rotatable dual-cup suction device as claimed in claim 1, wherein the attaching seat has a distal end to which a locking element is provided so that the attaching seat and the locking element together securely fix the second evacuation structure in position.

* * * * *